(12) United States Patent
Kamble et al.

(10) Patent No.: US 8,923,299 B2
(45) Date of Patent: Dec. 30, 2014

(54) SEGMENTATION AND REASSEMBLY OF NETWORK PACKETS

(75) Inventors: Keshav G. Kamble, Fremont, CA (US); Dar-Ren Leu, San Jose, CA (US); Chandarani J. Mendon, San Jose, CA (US); Vijoy Pandey, San Jose, CA (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 89 days.

(21) Appl. No.: 13/619,283

(22) Filed: Sep. 14, 2012

(65) Prior Publication Data

US 2014/0079076 A1    Mar. 20, 2014

(51) Int. Cl.
*H04L 12/28* (2006.01)

(52) U.S. Cl.
USPC .......................................................... 370/392

(58) Field of Classification Search
USPC ......... 370/203, 204–215, 229–240, 310–394, 370/395.1, 395.3, 395.4, 395.41, 395.42, 370/395.5, 395.52, 431–529, 523–520
See application file for complete search history.

(56) References Cited

U.S. PATENT DOCUMENTS

| | | | |
|---|---|---|---|
| 5,446,726 A | | 8/1995 | Rostoker et al. |
| 6,704,794 B1 * | | 3/2004 | Kejriwal et al. ............ 709/236 |
| 6,781,992 B1 * | | 8/2004 | Rana et al. ................. 370/394 |
| 7,447,777 B1 * | | 11/2008 | Singh Ahuja et al. ....... 709/227 |
| 7,643,486 B2 * | | 1/2010 | Belz et al. .................. 370/392 |
| 8,218,538 B1 * | | 7/2012 | Chidambaram et al. ..... 370/386 |
| 8,243,618 B2 * | | 8/2012 | Battestilli et al. ........... 370/252 |
| 2005/0074001 A1 * | | 4/2005 | Mattes et al. ............... 370/389 |
| 2006/0002386 A1 * | | 1/2006 | Yik et al. .................... 370/389 |
| 2006/0026378 A1 * | | 2/2006 | Sikdar et al. ................ 711/170 |

(Continued)

FOREIGN PATENT DOCUMENTS

| | | |
|---|---|---|
| KR | 2008083827 A | 9/2008 |
| KR | 2010116458 A | 11/2010 |

OTHER PUBLICATIONS

Iyer, S. et al., "ClassiPI: An Architecture for Fast and Flexible Packet Classification," IEEE Network, Mar./Apr. 2001, pp. 33-41, vol. 15, No. 2, IEEE, United States.

(Continued)

*Primary Examiner* — Jung-Jen Liu

(57) ABSTRACT

Reassembly of fragments into a packet comprises receiving an incoming fragment of a packet from a network wherein each fragment comprises a segment of the packet and a header, generating a reassembly key using selected information from the incoming fragment header wherein the selected information is the same for all fragments of the packet, checking a reassembly table in a content addressable memory to find an entry that includes a logic key matching the reassembly key, and using a content index in the found entry and a sequence number of the incoming fragment within the packet, to determine a location offset in a reassembly buffer area for storing the incoming fragment at said location offset in the reassembly buffer area for the packet for reassembly.

19 Claims, 8 Drawing Sheets

(56) References Cited

U.S. PATENT DOCUMENTS

| | | | |
|---|---|---|---|
| 2006/0039379 A1* | 2/2006 | Abe et al. | 370/394 |
| 2006/0106946 A1* | 5/2006 | Agarwal et al. | 709/250 |
| 2006/0155875 A1* | 7/2006 | Cheriton | 709/245 |
| 2006/0179156 A1* | 8/2006 | Eatherton et al. | 709/238 |
| 2006/0274742 A1* | 12/2006 | Pong | 370/389 |
| 2007/0195761 A1* | 8/2007 | Tatar et al. | 370/389 |
| 2007/0195773 A1* | 8/2007 | Tatar et al. | 370/392 |
| 2007/0195777 A1* | 8/2007 | Tatar et al. | 370/392 |
| 2007/0195778 A1* | 8/2007 | Tatar et al. | 370/392 |
| 2008/0117913 A1* | 5/2008 | Tatar et al. | 370/392 |
| 2008/0198854 A1* | 8/2008 | Mattes et al. | 370/392 |
| 2011/0019670 A1* | 1/2011 | Mattes et al. | 370/389 |
| 2011/0064084 A1* | 3/2011 | Tatar et al. | 370/392 |
| 2014/0079075 A1 | 3/2014 | Kamble et al. | |

OTHER PUBLICATIONS

U.S. Non-Final Office Action for U.S. Appl. No. 13/619,158 mailed Feb. 12, 2014.

U.S. Final Office Action for U.S. Appl. No. 13/619,158 mailed Jun. 23, 2014.

* cited by examiner

| Version | IHL | Type of Service | Total Length | |
|---|---|---|---|---|
| Identification | | | Flags | Fragment Offset |
| Time To Live | | Protocol | Header Checksum | |
| Source IP Address | | | | |
| Destination IP Address | | | | |
| Options | | | | Padding |

FIG. 5C

SEGMENTATION AND REASSEMBLY OF
NETWORK PACKETS

BACKGROUND

1. Field of the Invention

The present invention relates generally to packet processing, and in particular, to packet segmentation and reassembly in information technology networks.

2. Description of Related Art

In information technology networks, switching devices direct packets. A switching device redirects incoming data on one network node, out to another network node. Latency in such a network includes the time required for a packet to traverse the network from a source (transmitter) to a destination (receiver). One component of latency involves segmentation and reassembly of network packets in a networking switch.

A segmentation module performs segmentation of network packets. Segmentation comprises fragmenting a packet, such as a variable length packet, into fixed packet fragments to be transported across a network. Thereafter, the packet fragments are reassembled to reconstitute the original packet.

All the fragments of specific packets are called member packet fragments of that packet. A header is provided for each packet fragment. The header is formed from packet pre-classification information added by an ingress packet processor. A packet context is a buffer (i.e., packet buffer context) where member packet fragments which completely match the criteria of membership of a packet are put together. Logic to perform segmentation and reassembly is time consuming and adds significant latency in packet forwarding in the network.

BRIEF SUMMARY

Embodiments of the invention relate to packet processing including processing of packets in packet networks in distributed information technology environments. One embodiment comprises segmentation and reassembly of network packets for reducing data communication latency in packet networks. One embodiment comprises segmentation of a packet into fragments and reassembly of the fragments for a given packet buffer context, in a packet-based distributed system.

According to embodiments of the invention, a process for reassembly of fragments into a packet comprises receiving an incoming fragment of a packet from a packet network wherein each fragment comprises a segment of the packet and a header, generating a reassembly key using selected information from the incoming fragment header wherein the selected information is the same for all fragments of the packet, checking a reassembly table in a content addressable memory to find an entry that includes a logic key matching the reassembly key, and using a content index in the found entry and a sequence number of the incoming fragment within the packet, to determine a location offset in a reassembly buffer area for storing the incoming fragment at said location offset in the reassembly buffer area for the packet for reassembly.

The reassembly process further includes maintaining a reassembly table in a content addressable memory, wherein the reassembly table includes one or more entries corresponding to one or more packets, and wherein each entry comprises a logic key for a corresponding packet and a content index into a reassembly buffer area for storing incoming fragments of that packet.

Maintaining the reassembly table includes, in response to an incoming fragment of a packet, if the incoming fragment is a Start of packet (SOP) fragment of a packet or if the incoming fragment lookup key is not found in the reassembly table, generating a new logic key using selected information from the incoming fragment header wherein the selected information is the same for all fragments of the packet, allocating an area of the reassembly buffer for storing fragments of the packet, and placing a new entry into the reassembly table. The new entry includes said new logic key and a new content index into the reassembly buffer area for storing incoming fragments of that packet.

The packet is reassembled using the stored fragments in the reassembly buffer area for the packet using fragment offset number or sequence number from packet header. The fragment offset number with respect to the packet is unique for each fragment. The fragment offset number or sequence number is not included in the reassembly key formation. The network comprises an Internet Protocol (IP) network in a distributed information technology environment.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5C illustrates an Internet Protocol (IP) packet header.

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. One or more exemplary embodiments of the invention are described below in detail. The disclosed embodiments are intended to be illustrative only since numerous modifications and variations therein will be apparent to those of ordinary skill in the art.

Embodiments of the invention relate to packet processing including processing of network packets in information technology networks. One embodiment comprises low overhead segmentation and reassembly of packets, such as Internet Protocol (IP) packets, for reducing data communication latency.

One embodiment comprises segmentation of a packet into member packet fragments and reassembly of the member packet fragments for a given packet buffer context. One embodiment of the invention provides Transmission Control Protocol (TCP) acceleration or packet fragmentation and reassembly for servers and other systems.

According to an embodiment of the invention, a process for reassembly of fragments into a packet comprises obtaining a Start of packet (SOP) packet fragment or any first out of sequence packet fragment of a new packet, constructing an associated packet buffer context, receiving member packet fragments of that packet, copying the member packet fragments without headers and placing them in sequence in the packet buffer context, and after all the member packet fragments are in the buffer, providing content of the packet buffer context as the reassembled packet for further processing.

Figure 1:
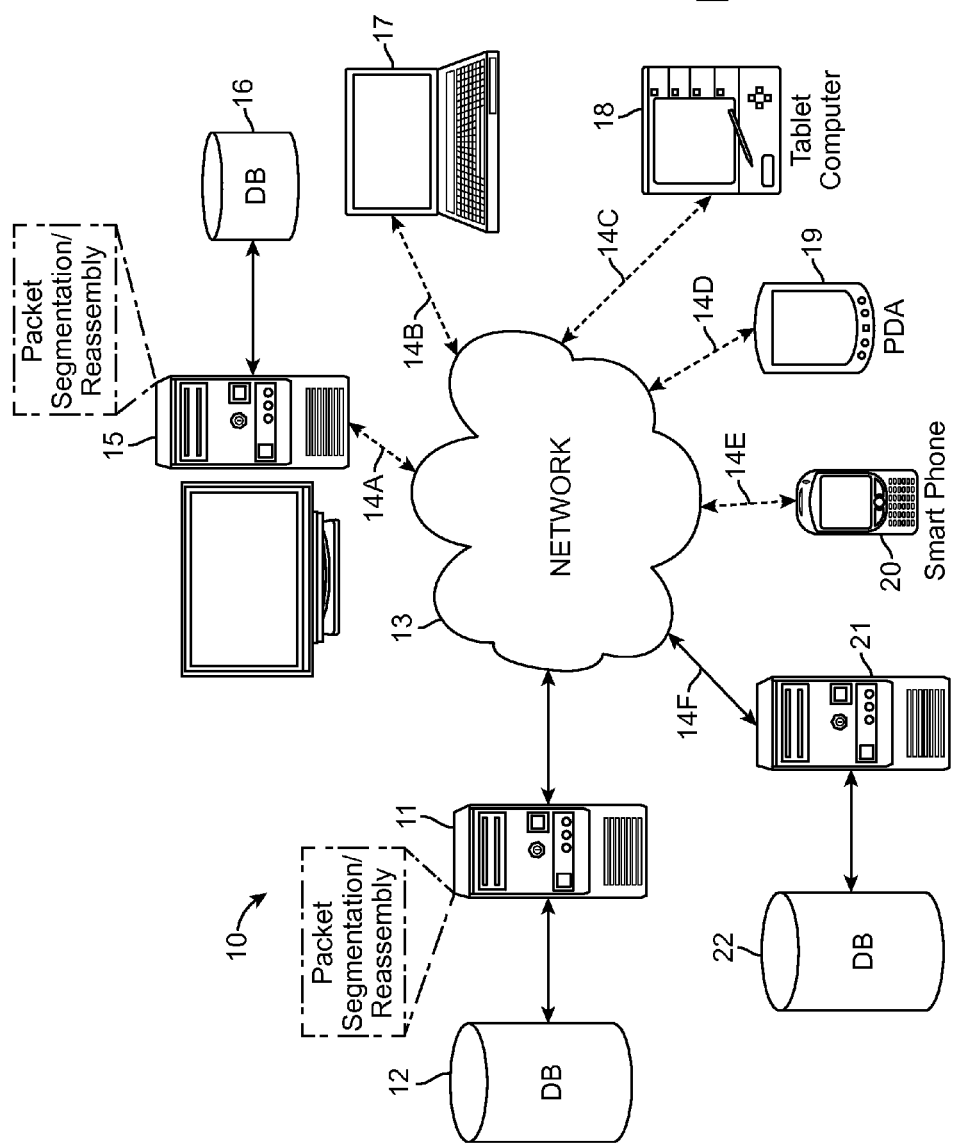
FIG. 1 is a block diagram illustrating an example information technology system utilizing packet processing, according to an embodiment of the present invention.

Referring now to the drawings, example embodiments of the present invention are now described. FIG. 1 illustrates an example of the basic components of an information technology system 10 utilizing packet processing, according to an embodiment of the present invention. The system 10 includes a server 11 and the remote devices 15 and 17-20 that utilize a packet processing system 100 (FIG. 2) implementing a packet processing method, according to an embodiment of the present invention.

Figure 2:
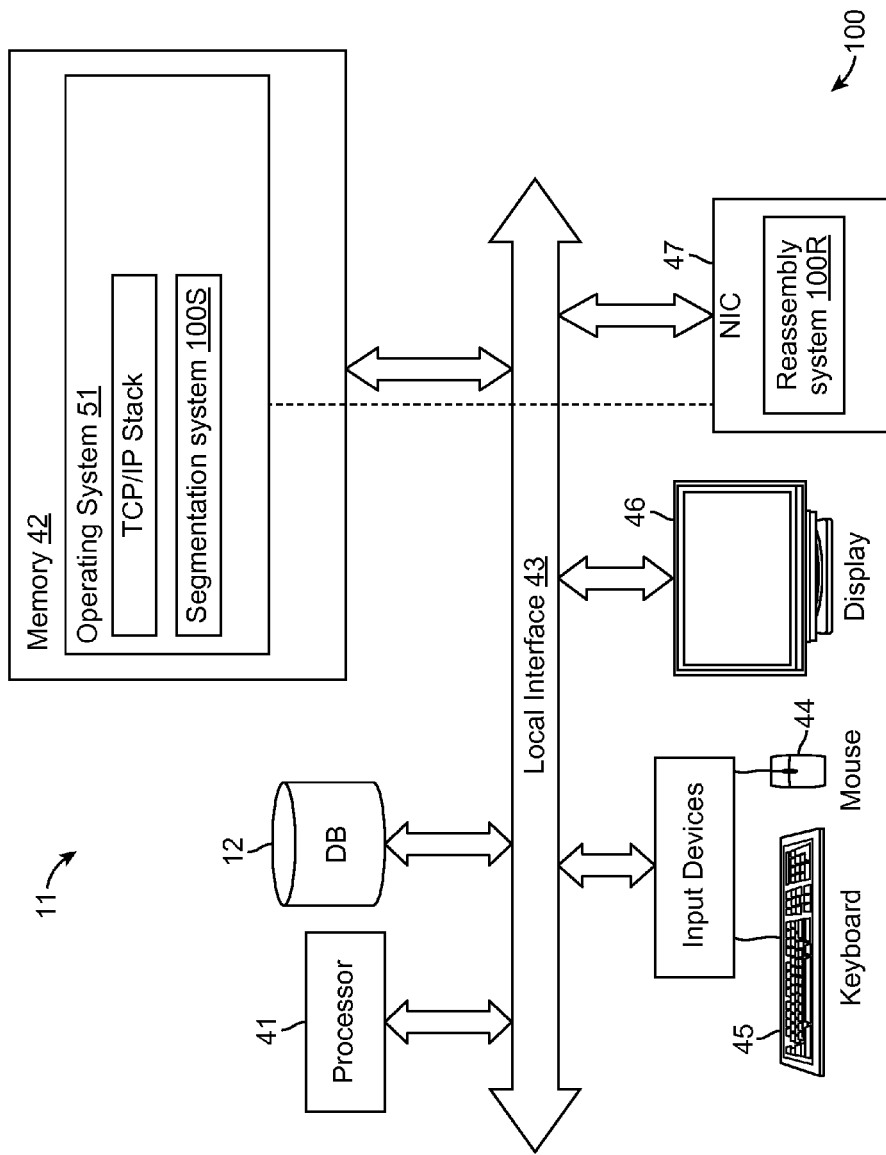
FIG. 2 is a block diagram illustrating an example of a computing system utilizing a packet processing system, according to an embodiment of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." For example, in one implementation packet processing according to an embodiment of the invention is implemented in software, as shown by solid-line block 100 within memory 42 in FIG. 2. In another example, packet processing according to an embodiment of the invention is implemented in hardware, as shown by the broken-line block 100 in FIG. 2.

Each of the remote devices 15 and 17-20 has applications and can have a local database 16. Server 11 contains applications, and a database 12 that can be accessed by remote device 15 and 17-20 via connections 14(A-F), respectively, over network 13. In one implementation, the server 11 executes software for a computer network and controls access to itself and database 12.

Illustrated in FIG. 2 is a block diagram demonstrating an example of server 11, as shown in FIG. 1, utilizing a packet processing system 100 according to an embodiment of the present invention. The packet processing system comprises a segmentation system 100S and a reassembly system 100R, according to an embodiment of the invention. In one embodiment, the segmentation system 100S implements segmentation of packets into member packet fragments, and the reassembly system 100R implements reassembly of member packet fragments into a packet, according to the invention.

The remote devices 15 and 17-20 may access the database 12 over a network 13, such as but not limited to: switched fabric network, the Internet, a local area network (LAN), a wide area network (WAN), via a telephone line using a modem (POTS), Bluetooth, WiFi, WiMAX, cellular, optical, satellite, radio frequency (RF), Ethernet, magnetic induction, coax, RS-485, the like or other like networks. The server 11 may also be connected to the LAN within an organization.

The remote devices 15 and 17-20 may each be located at remote sites. Remote devices 15 and 17-20 include but are not limited to, PCs, workstations, laptops, handheld computers, pocket PCs, PDAs, pagers, WAP devices, non-WAP devices, cell phones, palm devices, printing devices and the like. When a user at one of the remote devices 15 and 17-20 desires to access data from the database 12 at the server 11, the remote device 15 and 17-20 communicates over the network 13, to access the server 11 and database 12. The server 11 may comprise a Web server. The network 13 and connected devices (e.g., computing systems 11, 15, 17, 21, etc.), may implement TCP/IP for IP packet communication there between.

Data that are obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

The server 11 includes, but is not limited to, PCs, workstations, laptops, PDAs, palm devices and the like. The processing components of the third party computer systems are similar to that of the description for the server 11 (FIG. 2). Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the packet processing system 100 of the present invention. The packet processing system 100 comprises functional components and process blocks described further below.

The O/S 51 essentially controls the execution of other computer programs, such as a communication stack including the packet processing system 100, and provides scheduling, input/output control, file and data management, memory management, and communication control and related services. However, the packet processing system 100 of the present invention is applicable on other operating systems. In one embodiment, the segmentation system 100S sends packets to the O/S 51 via a Network Interface Card (NIC) 47. In one embodiment, the O/S 51 provides received packets to the segmentation system 100R via the NIC 47 for reassembly. The NIC 47 comprises processor, memory, logic and communication modules for processing packets.

The packet processing system 100 may comprise a source program, executable program (object code), script, or any other entity comprising a set of computer program instructions to be performed. When the packet processing system 100 is a source program, then the program is usually translated via a compiler, assembler, interpreter, or the like, which may or may not be included within the memory 42, so as to operate properly in connection with the O/S 51. Furthermore, the packet processing system 100 can be written as (a) an object oriented programming language, which has classes of data and methods, or (b) a procedure programming language, which has routines, subroutines, and/or functions. The computer program instructions may execute entirely on server 11, partly on server 11, as a stand-alone software package, partly on server 11 and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC 47 (for accessing remote devices, other files, devices, systems, or a network, etc.).

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The packet processing system 100 and the O/S 51 are read, in whole or in part, by the processor 41, perhaps buffered within the processor 41, and then executed.

When the packet processing system 100 is implemented in software, it should be noted that the packet processing system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

When the packet processing system 100 is implemented in hardware, the packet processing system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Remote devices 15 and 17-20 provide access to the packet processing system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data. As illustrated, the remote devices 15 and 17-20 are similar to the description of the components for server 11 described with regard to FIG. 2. The remote devices 15 and 17-20 will be referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 3A:
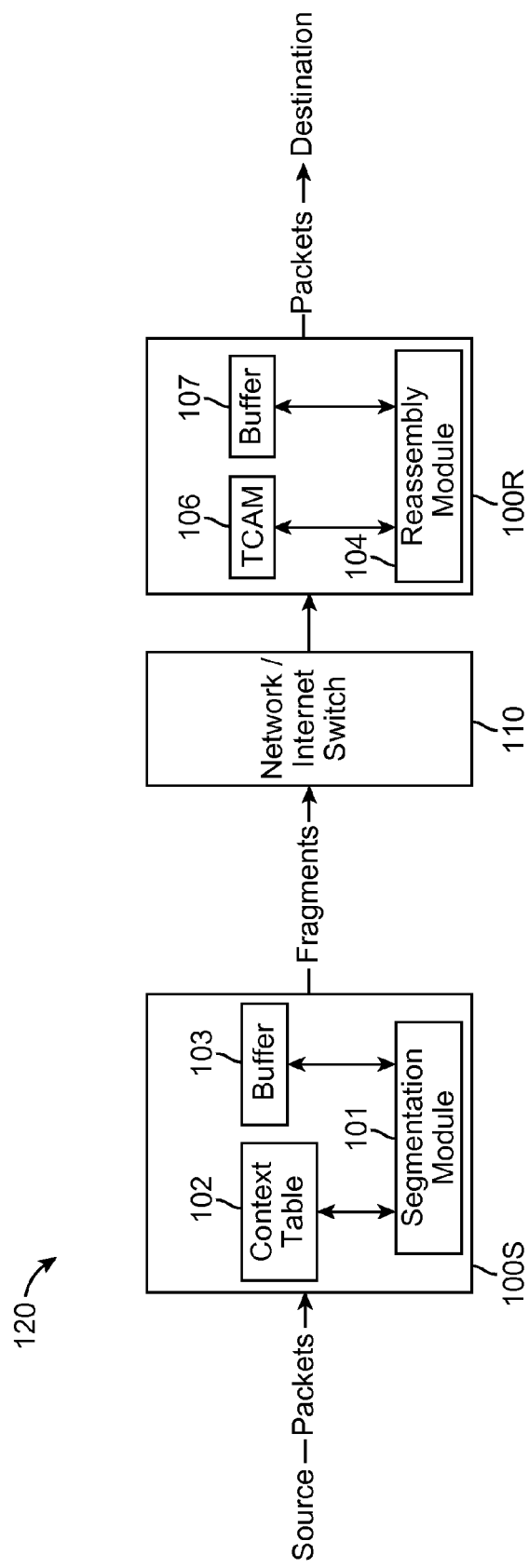
FIG. 3A is a block diagram illustrating an example of a packet processing system, according to an embodiment of the present invention.

In one embodiment, the packet processing system 100 may be implemented on at least two devices such as system 15 and system 11, connected via a communication link 13. Exemplary embodiments of the packet processing system 100 according to the present invention are described herein below in relation to the example system 11 (FIG. 2), in conjunction with a segmentation and reassembly architecture 120 as shown in FIG. 3A. A segmentation system 100S implements segmentation of packets into member packet fragments, and a reassembly system 100R implements reassembly of member packet fragments into a packet, according to the invention. A segmentation system 100S operates independent of a reassembly system 100R. Multiple segmentation systems 100S may be connected to the network 110 (e.g., packet network).

Figure 3B:
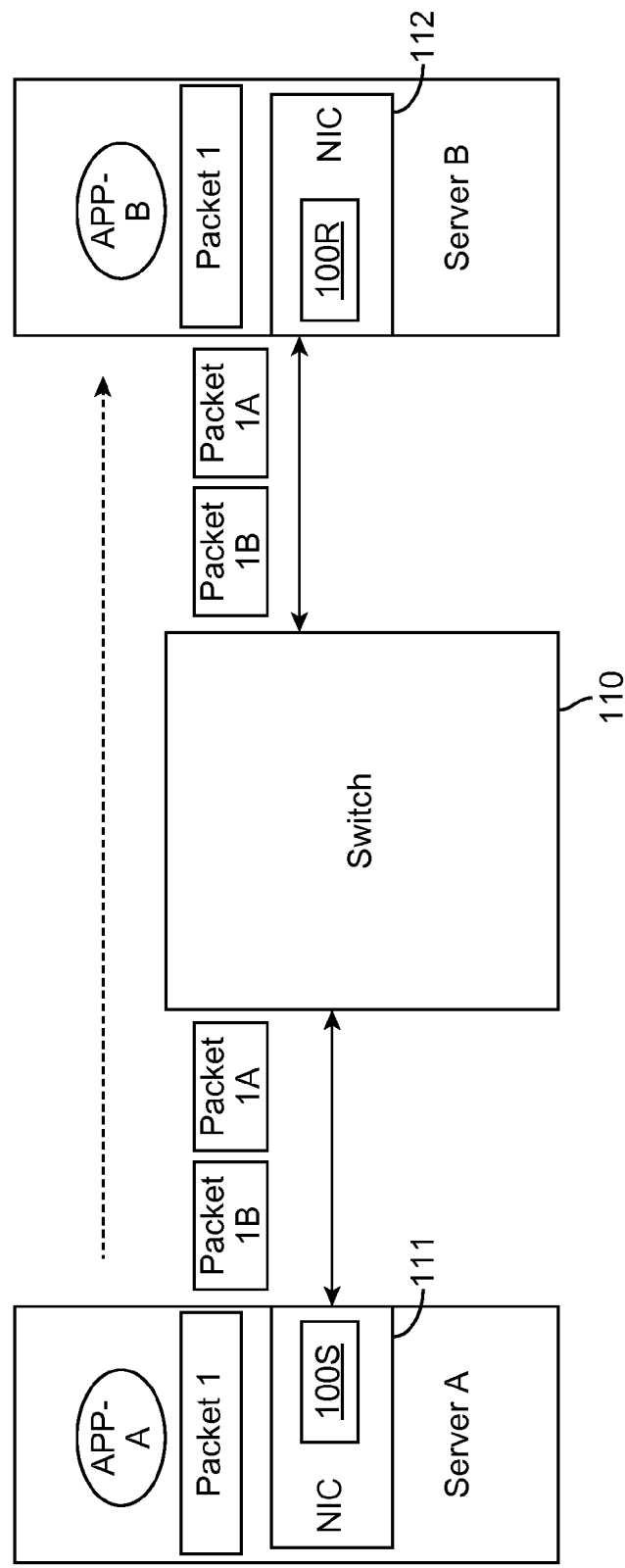
FIG. 3B is a block diagram illustrating an example of a packet processing system implemented in servers, according to an embodiment of the present invention.

Similarly multiple reassembly systems 100R may be connected to the network 110. As shown in FIG. 3B, in one embodiment, the system 100S is implemented in a NIC 111 of a host system such as Server A (i.e., source). In one embodiment, the system 100R is implemented in a NIC 112 of a host system such as Server B (i.e., destination).

Application source (Server A) generates large data blocks. A driver divides each data block into multiple fragments and the NIC 111 sends the fragments out as Ethernet packets in a flow. Each packet has a destination address and transport protocol. In the switch, each packet is given a sequence number and fragment offset, and sent to the target (Server B). In the NIC 112, the received packet fragments are identified as fragments belonging to the same block, and reassembled. After reassembly the block is handed over to the application at Server B. In the example shown in FIG. 3B, Packet 1=Packet 1A+Packet 1B.

To speed up the reassembly, according to the invention, the assembly algorithm uses the IP header of each received fragment for reassembly using sequence number and fragment offset. The reassembly mechanism identifies fragments for each context and performs reassembly. Normally, reassembly complexity is in the order of m×n wherein m is number of contexts, n is number of fragments per context. The invention reduces that complexity using TCAM acceleration for TCP acceleration to TCP offload NIC (or in OS kernel). First packet fragments may be Maximum Transfer Unit (MTU) size, but a last packet fragments might not be MTU size.

Each segmentation system 100S and each reassembly system 100R communicate with a network 110. In one embodiment of the invention, the architecture 120 may be implemented across a distributed system (e.g., a segmentation system 100S in computer system 15, the reassembly system 100R in computer system 11, network 110 in network 13). In another embodiment of the invention, the architecture 120 may be implemented within a communication switch.

A segmentation system 100S includes a segmentation module 101, a context table 102 and a buffer 103. The segmentation module 101 includes segmentation logic. The segmentation system 100S receives packets, such as IP packets, wherein the segmentation module 101 segments each packet into member packet fragments for transport over the network 110, wherein the network 110 routes each packet fragment to an appropriate reassembly system 100R for reassembly into a packet. A packet fragment comprises a header and a payload. The context table 102 provides the status of each received packet.

In one embodiment, the segmentation module 101 segments an incoming packet according to MTU size. Common elements of the packet fragment header in a given packet can be saved in buffer 103 as a common structure. As the segmentation module 101 concatenates the packet fragment header to a packet fragment payload, the common structure may also be included, along with a (recalculated) sequence number and parity information for error correction.

Further, a reassembly system 100R comprises a reassembly module 104, a content addressable memory 106 such as a TCAM, and a buffer 107. TCAM is a ternary content addressable memory. With a content addressable memory, the data is provided to the content addressable memory, and the content addressable memory returns a list of addresses where the data is stored, if found. Content addressable memory searches the entire memory in one operation. When a generated reassembly key is provided to the TCAM and in one operation the TCAM returns an entry in the reassembly table where a matching logic key is stored, if found. The algorithmic complexity of TCAMs search algorithm is O(1).

For reassembly, matching a packet fragment to a packet is based on certain contexts. Each packet fragment context is checked and if it matches a buffer context the packet fragment belongs to, then the packet fragment is stored in that buffer context for reassembling a packet. A first packet fragments is received at the NIC 112. Tuples are extracted from header except CRC, Fragment Offset, More Fragment Flag. TCAM search, O(1) complexity operation, returns context buffer index. Packet fragment payload is copied to a buffer according t the Fragment Offset. Resulting packet is copied into DMA buffer for Kernel use.

Figure 4:
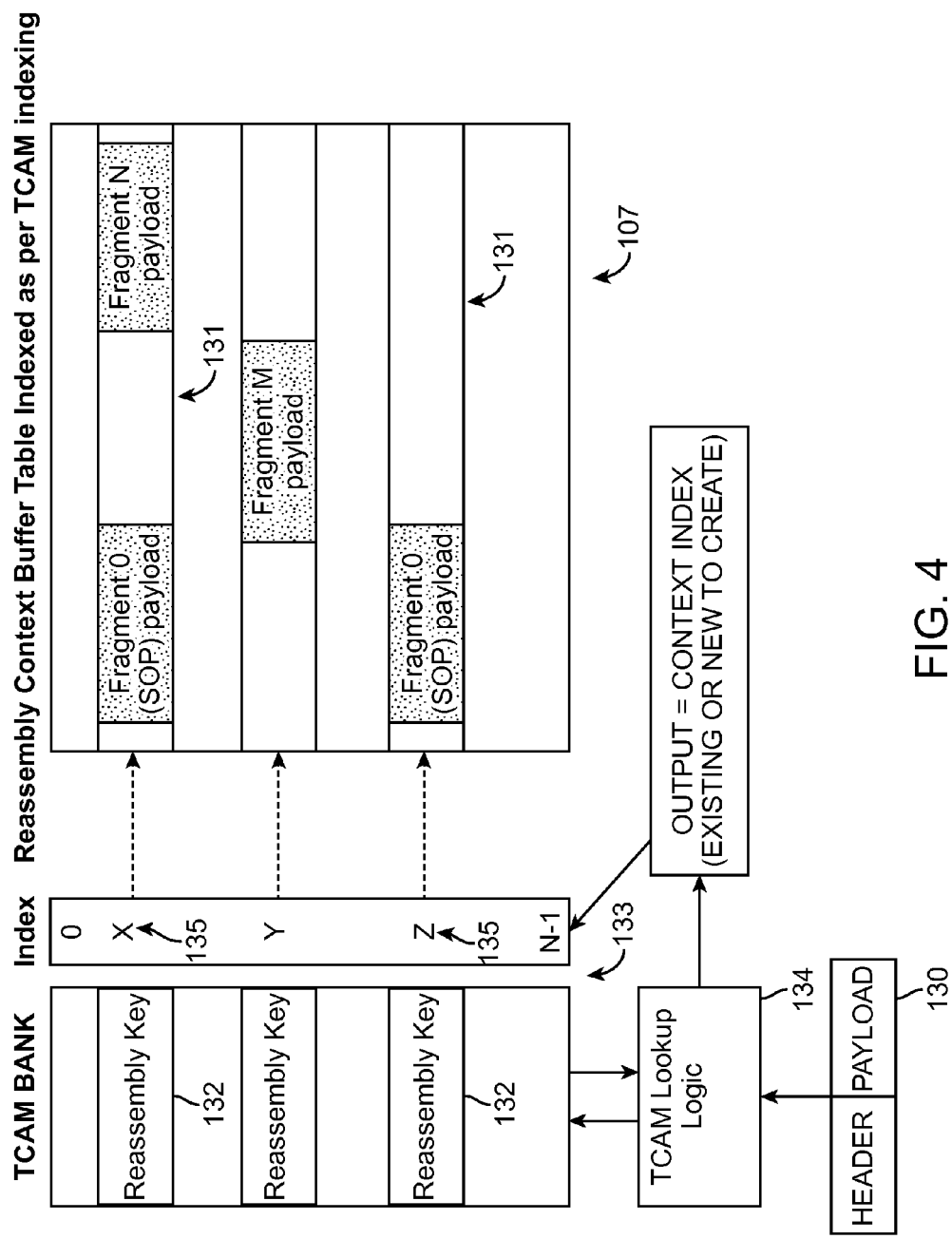
FIG. 4 is a block diagram illustrating an example reassembly module of a packet processing system, according to an embodiment of the present invention.

FIG. 4 illustrates an example operation of the reassembly system 100R according to reassembly logic of the reassembly module 104. When a SOP packet fragment arrives at the reassembly system 100R, there is no context, and there is no content index in the TCAM table 133. As such, for a SOP packet fragment of a new packet, a new reassembly logic key 132, and corresponding content index 135, is created and stored in a TCAM table 133.

A reassembly logic key 132 for a packet fragment is created using tuples (i.e., ordered lists of elements) which are extracted from the packet fragment header elements. Important Header Fields for IP Fragmentation and Reassembly are as follows (FIG. 5C shows an example IPv4 Header Format):
1. Total length: Total length of the payload.
2. Fragment Flags:
    bit 0: Reserved; must be zero,
    bit 1: Don't Fragment (DF),
    bit 2: More Fragments (MF).
3. More Fragments Flag: Set to 1 for all fragments except last fragment.
4. Fragment Offset: based on the offset of the segment in the original data payload. This is measured in units of eight-byte blocks.
5. Identification: 16 bit Id number of the IP packet.
6. CRC: Header checksum.

Important NIC properties include MTU (Maximum Transfer Unit per IP interface), and Buffering capability.

A sequence number of the packet fragment is not used in generating the logic key 132. The logic key 132 is placed in a TCAM table 133 comprising a TCAM bank in the TCAM 106. The logic key 132 includes those elements of the packet fragment header that do not change across the different packet fragments in a given packet. The sequence number (i.e., the sequence of the packet fragment in a given packet) is not used to create the logic key 132.

Further, a reassembly packet buffer context 131 is constructed in the reassembly buffer 107 where the SOP packet fragment is stored. The packet buffer context 131 has an associated content index 135 which indicates location of the packet buffer context 131 in the buffer 107. For each logic key 132 there is a corresponding content index 135 in the TCAM table 133. In one example, a content index X is associated with (or maps to) a first packet buffer context 131 (buffer segment), a content index Y is associated with (or maps to) a second packet buffer context 131, a content index Z is associated with (or maps to) a third packet buffer context 131, etc. As such, each content index corresponds to a packet buffer context 131 where packet fragments of the same context are stored for reassembly purposes.

As such, for a new logic key 132, the TCAM table 133 is also populated with a content index 135 for a new packet buffer context 131. For all subsequent packet fragments of a packet, TCAM table lookups for existing logic keys provide content indices of the already created packet buffer contexts 131.

Generally, the logic key serves as a way to lookup an index in the TCAM table for an incoming packet fragment 130. The lookup logic finds context index of reassembly context (i.e., packet buffer context 131) for each incoming packet fragment based on context of that packet fragment.

Each packet fragment carries a sequence number which identifies its sequence in the packet. The sequence number is an offset into the associated packet buffer context 131 where the packet fragment is stored. The sequence number is not part of the logic key.

A logic key 132 is used as input to a TCAM lookup logic 134 for the TCAM table 133. For a given logic key 132, the TCAM lookup logic looks up a content index 135 in the TCAM table, wherein the content index is an index into the buffer 107 where a packet buffer context 131 for an incoming packet fragment resides. As such, the content index 135 are offsets into the buffer 107 for the packet buffer contexts 131 of incoming packet fragments (e.g., fragment 0, . . . , fragment N).

As successive packet fragments arrive, logic keys are created using tuples. For example, as a packet fragment arrives into egress, tuples are extracted from the packet fragment header to create a logic key, and the logic key is used in the TCAM lookup table to lookup index of a packet buffer context 131 associated with the packet fragment. Since this is a consecutive (or successive) packet fragment (not a SOP) of the packet, the TCAM logic 134 uses the logic key to look into the TCAM table for a context index 135 to the packet buffer context 131 associated with the packet fragment. The found content index provides an offset to the buffer 107 where a packet buffer context 131 for the incoming packet fragments for the packet are stored.

Once a context index 135 for a corresponding packet buffer context 131 of an incoming packet fragment is found, the packet fragment sequence number is used to find the offset for that packet fragment in the packet buffer context 131 in the reassembly buffer 107, and to store the packet fragment in that offset in the packet buffer context 131. As such, the sequence number of the packet fragments is an offset into the packet buffer context 131 associated with the packet fragment.

Storing the packet fragment includes linking the packet fragment into the corresponding packet context buffer 131 based on the index 135 into the reassembly buffer 107, using the sequence number of the packet fragments act as offset into the context buffer 131. As such the packet fragment header is removed, and the packet fragment is linked into the packet context buffer 131 as the packet is reassembled. A count of the packet fragments for each packet context buffer is maintained, wherein the entire packet is considered reassembled when the required packet fragment count for the packet is reached. At this point egress processing for the assembled packet can begin. In the above lookup logic, the algorithm complexity for lookup into the TCAM is O(1).

An example application is in general purpose computing handling of packets in TCP/IP for IP packet fragmentation and reassembly. A client device executes a browser, and connects to a server for data. Data from the browser is in IP packets, wherein each IP packet is segmented into packet fragments by switches. The packet fragments arrive at the server as packet fragments, wherein the server reassembles TCP fragments into packets.

Ingress processing (e.g., segmentation system 100S) creates packet fragments from packets and adds redundancy check, such as CRC, to each packet fragment before transport on network. A packet fragment coming into egress processing (e.g., reassembly system 100R) is checked for errors, such as by checking encoding, before the packet fragment is used for reassembly. If errors are detected, then error correction (e.g., forward error correction or backward error correction) corrects the errors in a packet fragment before reassembly. TCAM lookup logic can also detect errors in an incoming packet fragment in egress processing.

Figure 5A:
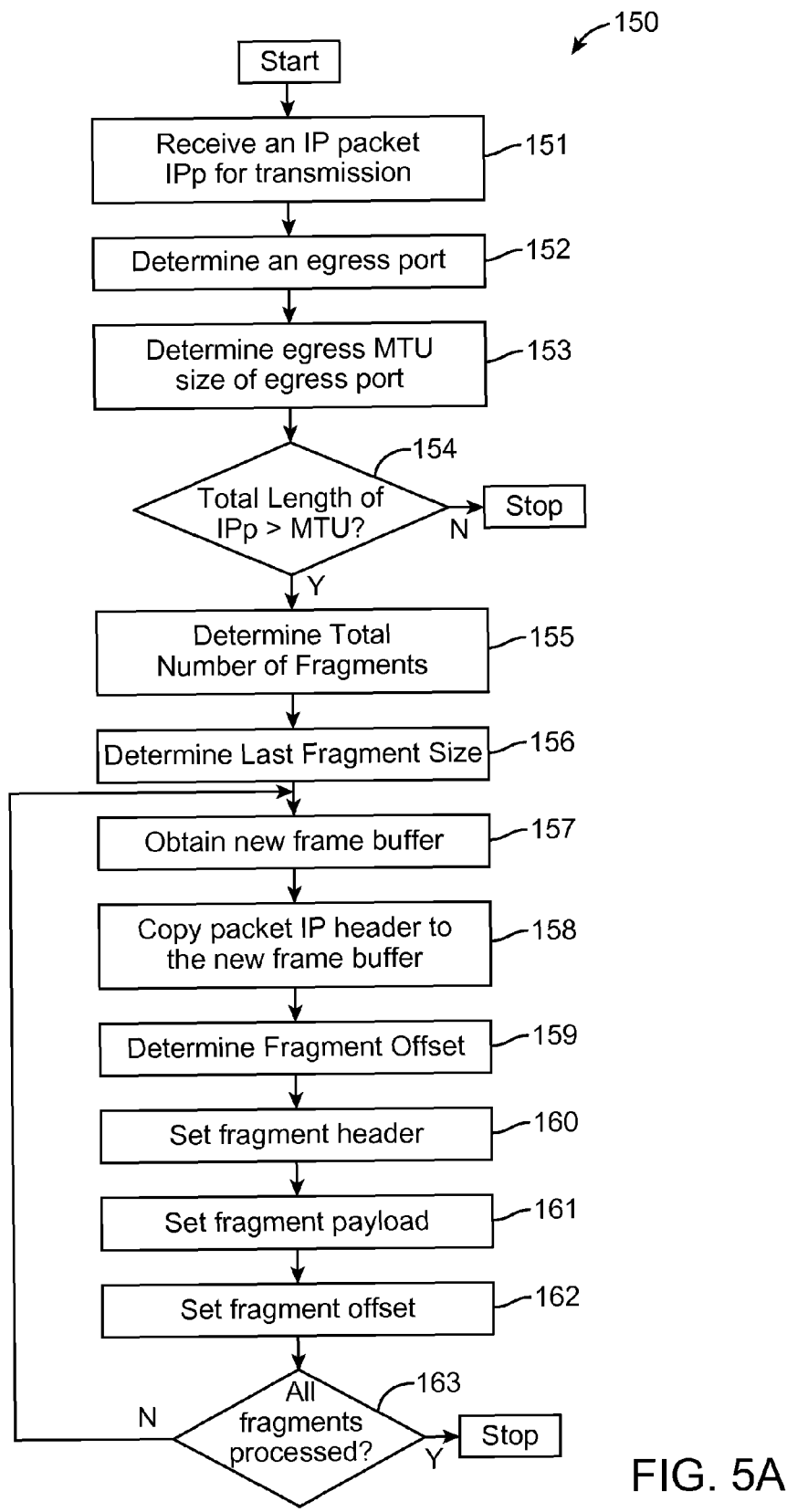
FIG. 5A is a flowchart showing a segmentation (fragmentation) packet processing system operation, according to an embodiment of the invention.

FIG. 5A shows a flowchart of segmentation (fragmentation) packet processing logic 150, according to an embodiment of the invention. According to an embodiment of the invention, one or more processing blocks of the logic 150 may be implemented in one or more servers, NICs, devices and/or switches in a distributed system.

In a fragmentation (segmentation) phase, in a device (e.g., segmentation system 100S of NIC 111 in FIG. 3B), process block 151 comprises receiving an IP packet IPp for transmission, process block 152 comprises determining an egress port, and process block 153 comprises determining Maximum Transfer Unit (MTU) size of the egress port, wherein MTU controls maximum number of bytes in one packet (e.g., 1518 bytes including IP header, packet payload) egressing out of a NIC. Process block 154 comprises determining if the Total Length of IPp is greater than MTU. If Total Length of IPp is greater than MTU, the process proceeds to process block 155 for fragmenting the IPp packet, otherwise the packet is not fragmented and the process stops.

Process block 155 comprises determining for that packet the Total Number of Fragments (Total Length INTEGER DIVISION BY MTU)+(Total Length MODULO DIVISION BY MTU? 1:0). In this example, (Total Length INTEGER DIVISION BY MTU) provides a whole integer value for the total number of fragments. The remaining bytes from the total length would be accommodated in the last fragment. (Total Length MODULO DIVISION BY MTU) provides the remaining bytes from the total length after dividing by MTU. If the remaining bytes are 0 that last fragment is not needed. As such, (Total Length MODULO DIVISION BY MTU? 1:0) returns 0. If (Total Length MODULO DIVISION BY MTU) provides a non-zero number, then (Total Length MODULO DIVISION BY MTU? 1:0) returns 1.

Process block 156 comprises determining Last Fragment Size=Total Length MOD MTU. Process block 157 comprises obtaining a new frame buffer. Process block 158 comprises copying IP header of the IPp packet to the new frame buffer. Process block 159 comprises determining Fragment Offset=N+1, wherein N=0 to (Total number of fragments−1).

In process block 160, if (N<Total number of fragments−1), then in the frame a More Fragment bit is set to 1, else that bit is set to 0. In process block 161, if (N<Total number of fragments−1), then next payload of <MTU> size is copied from the original packet to the frame buffer, otherwise the last remaining portion of payload of size <Last Fragment Size> is copied to the frame buffer.

In process block 162, Fragment Offset of the new packet is set to a value of N. In process block 163, all Options are copied to the new buffer, and a new CRC is calculated over the header. In process block 163, if ((N<Total number of fragments−1), then N=N+1 and proceed to process block 157, else stop fragmentation process for the packet. The frames comprise fragments of the IPp packet transmitted through the switch 110 to a destination (e.g., Server B in FIG. 3B).

Generally reassembly comprises receiving a packet fragment at the NIC. If as first member fragment, if More Fragments bit is 1 and Fragment Offset is valid, forward packet for reassembly. Packet Context identifies packet fragments of same identification number with Don't Fragment bit set to 0, Fragment Offset of non-zero number, More Fragment Bit set to 1 or 0, and all the other header parameters except CRC being exactly same. A new context is obtained if required. All received fragments of a packet with the same Identification Number, Don't Fragment Bit set to 0, Fragment Offset incremental, are considered wherein all but one fragment has More Fragment Bit set to 1.

All the other header parameters (e.g., Source IP, Destination IP, DSCP, etc.) are checked to be same in all the member fragments. Header CRC is excluded from the checking process. Payloads of all the member fragments are serialized based on fragment offset numbers in an incremental order. Member packet fragment payloads are combined as the reassembled payload of the IPp packet. An IP header may be appended to the reassembled payload (if required).

Figure 5B:
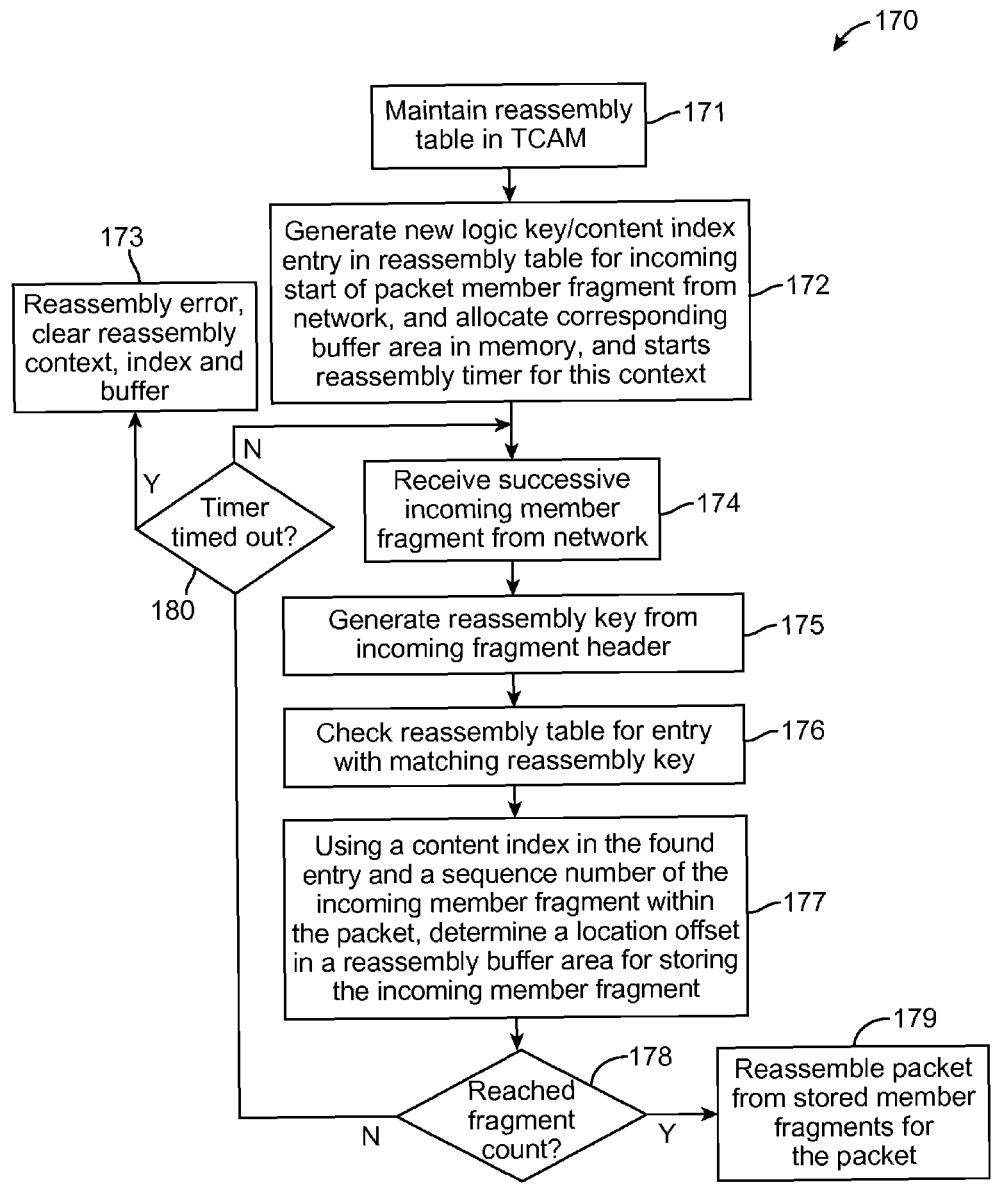
FIG. 5B is a flowchart showing a reassembly packet processing system operation, according to an embodiment of the invention.

FIG. 5B shows a flowchart of reassembly packet processing logic 170, according to an embodiment of the invention, in a reassembly phase in a device (e.g., reassembly system 100R of NIC 112 in FIG. 3B). Process block 171 comprises maintaining a reassembly table in a content addressable memory, wherein the reassembly table includes one or more entries corresponding to one or more packets, and wherein each entry comprises a logic key for a corresponding packet and a content index into a reassembly buffer area for storing incoming member packet fragments of that packet.

Process block 172 handles a SOP packet fragment of a packet. In response to receiving an incoming member packet fragment of a packet that is a SOP packet fragment or if the packet fragment lookup key is not found in the reassembly table (i.e., a non-SOP packet fragment if it arrives ahead of others, out of order) of a packet, process block 172 generates a new logic key using selected information from the SOP (or the received out of order non-SOP) packet fragment header, wherein the selected information is the same for all member packet fragments of the packet. Process block 172 further allocates an area of the reassembly buffer for storing member packet fragments of the packet, and places a new entry into the reassembly table, wherein the new entry includes said new logic key and a new content index into the reassembly buffer area for storing incoming member packet fragments of that packet.

Process block 172 also starts a reassembly timer for this context. The packet is reassembled using the stored member packet fragments in the reassembly buffer area for the packet using packet fragment offset number or sequence number from packet fragment header. The packet fragment offset number with respect to the packet is unique for each member packet fragment. The packet fragment offset number or sequence number is not included in the reassembly key formation.

Process block 174 comprises receiving a successive incoming member packet fragment of a packet from a network wherein each member packet fragment comprises a segment of the packet and a header. Process block 175 comprises generating a reassembly key using selected information from the incoming member packet fragment header wherein the selected information is the same for all member packet fragments of the packet. Process block 176 comprises checking a reassembly table in a content addressable memory to find an entry that includes a logic key matching the reassembly key.

Process block 177 comprises using a content index in the found entry and a sequence number of the incoming member packet fragment within the packet, to determine a location offset in a reassembly buffer area for storing the incoming member packet fragment at said location offset in the reassembly buffer area for the packet for reassembly. Process block 178 comprises checking if a member packet fragment count has been reached. If yes, process proceeds to block 179, otherwise the process proceeds to block 180. Process block 179 comprises reassembling the stored member packet fragments into a packet when a count is reached which indicates all member packet fragments of the packet are present.

Decision block 180 checks if a reassembly timer timed out. If all the packet fragments associated to a packet do not arrive within a certain time period starting from receiving the first packet fragment, then in process block 173 the logic declares the reassembly error and clears reassembly context 132, context index 135 and reassembly buffers 131. Otherwise the process proceeds to block 174 for next member packet fragment of the packet.

Other implementations of the invention are possible. In one embodiment, the packet processing system 100 may be implemented in the computer system 15. In another embodiment, the computer system 15 includes a packet processing system 100 and the server 11 includes a packet processing system. In another embodiment, the segmentation system 100S of the packet processing system 100 may be implemented in the computer system 15 and the reassembly system 100R of the packet processing system 100 may be implemented in the server 11. In another embodiment, segmentation system 100S of the packet processing system 100 may be implemented in the server 11, and the reassembly system 100R of the packet processing system 100 may be implemented in the system 15.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for reassembling fragments of a packet, comprising:
   receiving an incoming fragment of a packet from a packet network, wherein each fragment comprises a segment of the packet and a header;
   generating a reassembly key using selected information from the incoming fragment header, wherein the selected information is the same for all fragments of the packet;
   checking a reassembly table maintained in a content addressable memory to find an entry that includes a logic key matching the reassembly key;
   using a content index in the found entry and a sequence number of the incoming fragment within the packet, to determine a location offset in a reassembly buffer area for storing the incoming fragment; and
   storing the incoming fragment at said location offset in the reassembly buffer area for the packet for reassembly;
   wherein the reassembly table includes one or more entries corresponding to one or more packets, and wherein each entry comprises a logic key for a corresponding packet and a content index into a reassembly buffer area for storing incoming fragments of the corresponding packet.

2. The method of claim 1,
   wherein the selected information does not change across different fragments of the packet.

3. The method of claim 1, further comprising:
   in response to an incoming fragment of a packet, if the incoming fragment is a Start of Packet (SOP) fragment of a packet:
      generating a new logic key using selected information from the SOP fragment header, wherein the selected information is the same for all fragments of the packet;
      allocating an area of the reassembly buffer for storing fragments of the packet; and
      placing a new entry into the reassembly table, wherein the new entry includes said new logic key and a new content index into the reassembly buffer area for storing incoming fragments of that packet.

4. The method of claim 1, further comprising:
   reassembling the packet using the stored fragments in the reassembly buffer area for the packet.

5. The method of claim 4, wherein reassembling the packet comprises performing error detection and error correction for each fragment for packet reassembly.

6. The method of claim 1, wherein the content addressable memory comprises a ternary content addressable memory (TCAM), wherein the reassembly key is provided to the TCAM and in one operation the TCAM returns an entry in the reassembly table where a matching logic key is stored, if found.

7. The method of claim 1, wherein the network comprises an Internet Protocol (IP) network in a distributed information technology environment.

8. A packet processing system, comprising:
   a reassembly module that reassembles fragments of a packet, wherein each fragment comprises a segment of the packet and a header; and
   a content accessible memory;
   wherein the reassembly module receives an incoming fragment of a packet from a packet network and generates a reassembly key using selected information from the incoming fragment header, wherein the selected information is the same for all fragments of the packet;

wherein the reassembly module checks a reassembly table maintained in the content addressable memory to find an entry that includes a logic key matching the reassembly key; and wherein the reassembly modules uses a content index in the found entry and a sequence number of the incoming fragment within the packet, to determine a location offset in a reassembly buffer area for storing the incoming fragment for the packet for reassembly; and wherein the reassembly table includes one or more entries corresponding to one or more packets, and wherein each entry comprises a logic key for a corresponding packet and a content index into a reassembly buffer area for storing incoming fragments of the corresponding packet.

9. The system of claim 8, wherein the selected information does not change across different fragments of the packet.

10. The system of claim 9, wherein the reassembly module is configured such that in response to an incoming fragment of a packet, if the incoming fragment is a Start of packet (SOP) fragment of a packet, the reassembly module:

generates a new logic key using selected information from the SOP fragment header, wherein the selected information is the same for all fragments of the packet;

allocates an area of the reassembly buffer for storing fragments of the packet; and places a new entry into the reassembly table, wherein the new entry includes said new logic key and a new content index into the reassembly buffer area for storing incoming fragments of that packet.

11. The system of claim 8, wherein the reassembly module reassembles the packet using the stored fragments in the reassembly buffer area for the packet.

12. The system of claim 11, wherein the reassembly module detects and corrects errors in each fragment for packet reassembly.

13. The system of claim 8, wherein the content addressable memory comprises a ternary content addressable memory (TCAM), wherein the reassembly key is provided to the TCAM and in one operation the TCAM returns an entry in the reassembly table where a matching logic key is stored, if found.

14. The system of claim 9, wherein the network comprises an Internet Protocol (IP) network in a distributed information technology environment.

15. A method for reassembling fragments of a packet, comprising:

receiving an incoming fragment of a packet from a packet network, wherein each fragment comprises a segment of the packet and a header;

generating a reassembly key using selected information from the incoming fragment header, wherein the selected information is the same for all fragments of the packet;

checking a reassembly table maintained in a content addressable memory to find an entry that includes a logic key matching the reassembly key;

using a content index in the found entry and a sequence number of the incoming fragment within the packet, to determine a location offset in a reassembly buffer area for storing the incoming fragment;

storing the incoming fragment at said location offset in the reassembly buffer area for the packet for reassembly; and reassembling the packet using the stored fragments in the reassembly buffer area for the packet;

wherein the content addressable memory comprises a ternary content addressable memory (TCAM); and wherein the reassembly table includes one or more entries corresponding to one or more packets, and wherein each entry comprises a logic key for a corresponding packet and a content index into a reassembly buffer area for storing incoming fragments of the corresponding packet.

16. The method of claim 15, further comprising:

providing the reassembly key to the TCAM wherein in one operation the TCAM returns an entry in the reassembly table where a matching logic key is stored, if found currently amended;

wherein the selected information does not change across different fragments of the packet.

17. The method of claim 15, further comprising:

in response to an incoming fragment of a packet, if the incoming fragment is a Start of Packet (SOP) fragment of a packet:

generating a new logic key using selected information from the SOP fragment header, wherein the selected information is the same for all fragments of the packet;

allocating an area of the reassembly buffer for storing fragments of the packet; and placing a new entry into the reassembly table, wherein the new entry includes said new logic key and a new content index into the reassembly buffer area for storing incoming fragments of that packet.

18. The method of claim 16, wherein reassembling the packet comprises performing error detection and error correction for each fragment for packet reassembly.

19. The method of claim 16, wherein the network comprises an Internet Protocol (IP) network in a distributed information technology environment.

* * * * *